United States Patent
Wakita et al.

[11] Patent Number: 6,159,349
[45] Date of Patent: Dec. 12, 2000

[54] ELECTROLYTIC CELL FOR HYDROGEN PEROXIDE PRODUCTION

[75] Inventors: Shuhei Wakita; Yoshinori Nishiki, both of Kanagawa; Takayuki Shimamune; Yasuo Nakajima, both of Tokyo; Masaaki Katoh, Kanagawa; Yoshiyuki Kawaguchi, Kanagawa; Takahiro Ashida, Kanagawa; Masaharu Uno, Kanagawa, all of Japan

[73] Assignee: Permelec Electrode Ltd., Kanagawa, Japan

[21] Appl. No.: 09/185,034

[22] Filed: Nov. 3, 1998

[30] Foreign Application Priority Data

Nov. 7, 1997 [JP] Japan ................................. 9-322485

[51] Int. Cl.[7] .................................................. C25B 9/00
[52] U.S. Cl. ........................ 204/258; 204/265; 204/266; 204/277; 204/278; 204/283
[58] Field of Search .................... 204/265, 266, 204/283, 258, 277–278; 205/466

[56] References Cited

U.S. PATENT DOCUMENTS 4,969,981  11/1990  Rogers et al. ..................... 204/258 X
5,456,809  10/1995  Cooper ............................... 205/466 X
5,650,058   7/1997  Wenske et al. ..................... 204/258 X

*Primary Examiner*—Donald R. Valentine
*Attorney, Agent, or Firm*—Sughrue, Mion, Zinn, Macpeak & Seas, PLLC

[57] ABSTRACT

An electrolytic cell for producing a brine containing hydrogen peroxide is disclosed. Units for hydrogen peroxide production 3 and units for water electrolysis 2 are alternately arranged in the same electrolytic cell 1. Electrolysis is conducted while supplying hydrogen gas and oxygen gas generating in the respective water electrolysis units to a gas diffusion anode 11 and a gas diffusion cathode 13 of each unit for hydrogen peroxide production, to thereby obtain a brine containing hydrogen peroxide in a high concentration. Furthermore, because the anode of the hydrogen peroxide production units is a hydrogen gas diffusion anode having a reduced oxidizing ability, halogen ions contained in the seawater do not yield harmful halogenated organic substances.

15 Claims, 1 Drawing Sheet

ELECTROLYTIC CELL FOR HYDROGEN PEROXIDE PRODUCTION

FIELD OF THE INVENTION

The present invention relates to an electrolytic cell which employs gas diffusion electrodes and which is adapted for producing a brine containing hydrogen peroxide. More particularly, this invention relates to an electrolytic cell for use in obtaining a brine containing hydrogen peroxide in a higher concentration than that achieved by conventional electrolytic cells.

BACKGROUND OF THE INVENTION

Hydrogen peroxide is a useful basic chemical indispensable to the food, medicine, pulp, textile and semiconductor industries. Hitherto, hydrogen peroxide has been mass-produced by a continuous synthesis process in which a 2-alkylanthraquinol is autoxidized to obtain the target compound, and the anthraquinone simultaneously obtained is reduced with hydrogen to the original anthraquinone derivative. However, there is a growing desire for an on-site hydrogen peroxide production apparatus. Namely, not only is this a troublesome operation, e.g., repeated rectification is needed for purifying the mass-produced reaction product, but hydrogen peroxide is unstable and is incapable of being stored for long periods of time. Also, an on-site apparatus is desirable from the standpoints of safety in transportation and pollution abatement.

In power plants and factories where seawater is utilized as cooling water, a technique for preventing the attachment of organisms to the inside of a condenser has been employed which comprises directly electrolyzing seawater to generate hypochlorous acid, and utilizing the acid thus generated to inhibit organism attachment. However, restrictions are being placed on the use of hypochlorous acid from the standpoint of environmental conservation. This is intended to prevent the possibility of hypochlorous acid or generated chlorine reacting with marine organisms and organic substances present in the seawater to form organochlorine compounds, which reaction products may cause secondary pollution. On the other hand, it has been reported that the addition of a minute amount of hydrogen peroxide to the cooling water is sufficiently effective in preventing the attachment of organisms. It has further been reported that addition of hydrogen peroxide is effective also in maintaining the quality of water for use in fish breeding farms. However, there are still problems concerning safety in hydrogen peroxide transportation and pollution abatement as discussed above.

Processes for producing hydrogen peroxide through the reduction reaction of oxygen gas have hitherto been proposed. U.S. Pat. No. 3,693,749 discloses several apparatuses for the electrolytic production of hydrogen peroxide, while U.S. Pat. No. 4,384,931 discloses a process for producing an alkaline hydrogen peroxide solution with an ion-exchange membrane. U.S. Pat. No. 3,969,201 proposes a hydrogen peroxide production apparatus having a carbon cathode of a three-dimensional structure and an ion-exchange membrane. However, in these processes, the amount of alkali which must be used to generate hydrogen peroxide increases almost in proportion to the amount of hydrogen peroxide that is to be produced. Consequently, the hydrogen peroxide solution thus obtained has an alkali concentration that is too high relative to the concentration of hydrogen peroxide, and hence is of limited use.

U.S. Pat. Nos. 4,406,758, 4,891,107 and 4,457,953 disclose processes for producing hydrogen peroxide using a porous diaphragm and a hydrophobic carbon cathode. According to each of these patent publications, an aqueous alkaline hydrogen peroxide solution having a low sodium hydroxide/hydrogen peroxide weight ratio can be obtained. In these processes, however, the control of operating conditions is troublesome because the amount of electrolyte solution moving from the anode chamber to the cathode chamber and the rate of movement are difficult to control. In particular, the above processes have a drawback in that hydrogen peroxide cannot be produced in a constant proportion.

Journal of Electrochemical Society, Vol.130, pp. 1117- (1983) proposes a method for stably obtaining an acidic hydrogen peroxide solution in which a cation- and anion-exchange membrane is used and sulfuric acid is supplied to an intermediate chamber. Denki Kagaku, Vol.57, p.1073 (1989), proposes a technique for improving performance by using united membrane electrodes as an anode. Furthermore, Journal of Applied Electrochem., 25 (1995) pp.613–627 describes electrolytic processes for hydrogen peroxide synthesis known at that time. However, these techniques are disadvantageous in cost because the electric power consumption rate is too high, and further have a drawback in that the use and introduction of sulfuric acid is unavoidable. Hence, a fully satisfactory process for hydrogen peroxide production has not yet been developed.

In the aforementioned aqueous hydrogen peroxide solution having an alkali concentration that is too high, the concentration of hydrogen peroxide itself is satisfactory. However, these processes necessitate feeding an alkali ingredient because hydrogen peroxide is efficiently obtained only in an aqueous alkali solution environment, and hence these processes have problems with regard to transportation and safety.

On the other hand, in view of the aforementioned problem associated with direct seawater electrolysis, the use of hydrogen peroxide for seawater treatment is desirable from the standpoints of environmental conservation and economic efficiency, and various investigations are being made thereon. Among such techniques which have been investigated, the use of commercial hydrogen peroxide may give rise to, besides the problems described above, an environmental problem in that the addition of a synthesized chemical which has not been separated from the seawater contaminates the seawater. Also in the case where an alkali is externally supplied for alkali electrolysis for producing hydrogen peroxide, the same problem may arise.

In order to avoid these problems, the present inventors proposed a method comprising subjecting seawater to salt separation to obtain an alkali, obtaining hydrogen peroxide from the alkali, and neutralizing the alkali with an acid separated from the seawater. This method is nearly ideal in that the occurrence of environmental problems can be minimized because there is completely no need to add an external chemical, and in that the amount of electric power required is exceedingly small, although the apparatus therefor is complicated. Consequently, if the above method can be carried out with a simpler apparatus which can be handled more easily, a hydrogen peroxide production process closer to an ideal process can be achieved.

SUMMARY OF THE INVENTION

It is therefore an object of the present invention to provide an apparatus for producing hydrogen peroxide which has a simpler mechanism than conventional ones, and which is especially adapted for sterilizing seawater, etc.

The above object of the present invention has been achieved by providing an electrolytic cell for producing by electrolysis a brine containing hydrogen peroxide, which comprises a hydrogen gas diffusion anode and an oxygen gas diffusion cathode disposed apart from the anode, and an inlet and an outlet for passing a brine between the anode and the cathode. In particular, when electrolysis is conducted while supplying hydrogen gas and oxygen gas to the hydrogen gas diffusion anode and the oxygen gas diffusion cathode, respectively, then the apparatus can be operated at a low voltage and hydrogen peroxide is obtained in a concentration of about from several tens of ppm to 1,000 ppm completely without trihalomethane generation, which has frequently been a problem in seawater electrolysis. Desirably, the hydrogen and oxygen gases are not supplied from cylinders, but rather are supplied from an adjacent water-electrolyzing cell or are produced in the same electrolytic cell.

Figure 1:
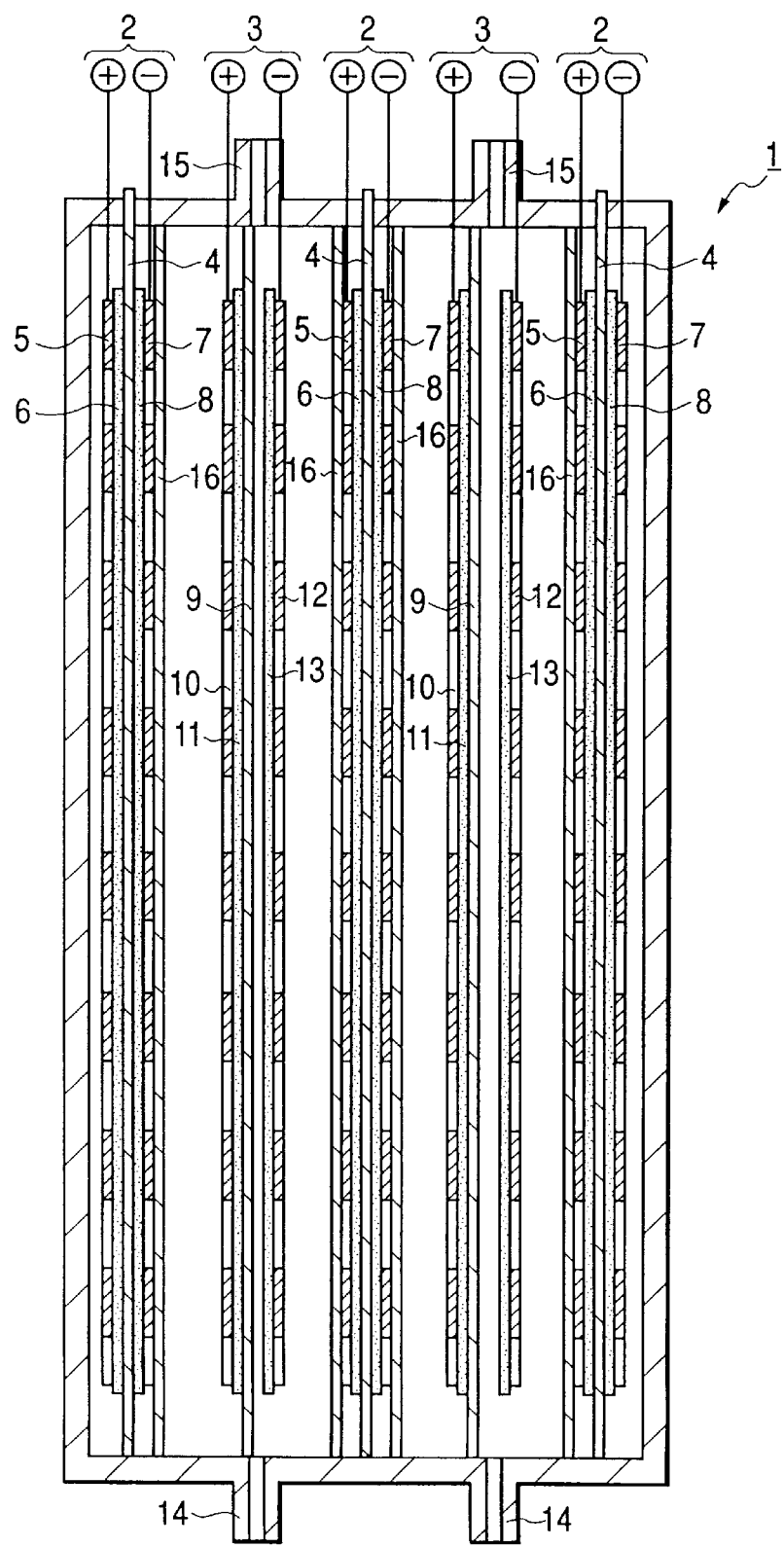
FIG. 1 is a vertical sectional view illustrating one embodiment of the electrolytic cell for hydrogen peroxide production according to the present invention.

1—Electrolytic cell main body
2—Unit for pure-water electrolysis
3—Unit for hydrogen peroxide production
4—Cation-exchange membrane
5—Anode collector
6—Gas diffusion anode
7—Cathode collector
8—Gas diffusion cathode
9—Cation-exchange membrane
10—Anode collector
11—Gas diffusion anode
12—Cathode collector
13—Gas diffusion cathode
14—Seawater inlet
15—Seawater outlet
16—Gas-permeable sheet

DETAILED DESCRIPTION OF THE INVENTION

In the present invention, a hydrogen gas diffusion anode is employed as the anode of an electrolytic cell for use in producing hydrogen peroxide by the electrolysis of a brine, e.g., seawater. Since this anode has a reduced oxidizing ability as compared with by ordinary anodes, chloride ion, bromide ion, and the like contained in seawater do not theoretically undergo oxidation. Hence, the generation of carcinogenic substances such as trihalomethanes and trihaloethanes can be inhibited. The present invention is compatible with the environment, in contrast to the use of conventional oxygen-generating anodes where the generation of such substances is not negligible.

The present invention can yield hydrogen peroxide even without using an alkali, although an alkali can be used therein. Consequently, the present invention is optimal for applications where the use of an alkali is undesirable.

In the electrolytic cell for hydrogen peroxide production of the present invention, an oxygen-containing gas and hydrogen gas are supplied to the cathode and the anode, respectively. These gases can be externally supplied, for example, from gas cylinders. In the present invention, however, the two gases are preferably produced essentially by water electrolysis, and it has thus become possible to produce a brine containing hydrogen peroxide in a concentration as high as about from several tens of ppm to 1,000 ppm. Furthermore, the present invention can contribute to a reduction in apparatus size. The electrolytic production of an oxygen-containing gas and hydrogen gas may be accomplished by disposing a water-electrolyzing cell close to the electrolytic cell for hydrogen peroxide production so that the oxygen-containing gas and hydrogen gas generated in this water-electrolyzing cell are supplied to the cathode chamber and the anode chamber of the electrolytic cell for hydrogen peroxide production, respectively. It is however desirable to arrange two or more units for hydrogen peroxide production and two or more units for water production alternately within the same electrolytic cell so that the oxygen-containing gas and hydrogen gas generated in the water electrolysis units are directly supplied to the respective cathode chamber and anode chamber of each unit for hydrogen peroxide production.

In the electrolytic production of hydrogen peroxide, the two electrode reactions are as follows.

Cathodic reaction: $O_2+H_2O+2e^-\rightarrow OH^-+HO_2^-$
Anodic reaction: $H_2\rightarrow 2H^++2e^-$ On the other hand, the electrode reactions in ordinary water electrolysis are as follows.

Cathodic reaction: $2H_2O+2e^-\rightarrow H_2+2OH^-$
Anodic reaction: $2H_2O\rightarrow O_2+4H^++4e^-$ These reaction schemes show that the amount of oxygen required for the reactions yielding hydrogen peroxide is about 2 times the amount of oxygen generated by the water electrolysis reactions using the same quantity of electricity.

The above means that when the two kinds of units are arranged such that one unit for hydrogen peroxide production corresponds to one unit for water electrolysis, then oxygen gas is in short supply. This problem can be eliminated by doubling the quantity of electricity supplied to the units for water electrolysis so that oxygen is generated in the same amount as the oxygen consumed by the reactions yielding hydrogen peroxide, or by feeding oxygen gas from an oxygen source, e.g., an oxygen cylinder, to the units for hydrogen peroxide production together with the electrolytically generated oxygen-containing gas. Besides oxygen gas supplied from a cylinder as an oxygen source, examples of the oxygen-containing gas include air and oxygen-enriched air which has been concentrated by PSA. For example, when electrolytically generated oxygen and the same amount of air are supplied as feed oxygen to the gas diffusion cathode of each unit for hydrogen peroxide production, then the feed gas has an actual oxygen concentration of about 60% and the actual electrolytic performance of the units is almost the same as that attainable with pure oxygen, such that amount no problems arise. It should, however, be noted that air contains carbon dioxide, which upon contact with an alkali may precipitate as an alkali carbonate, etc. Consequently, depending on the electrolytic conditions, it may be necessary to remove carbon dioxide from the air beforehand with a simple device.

As described above, in the present invention units for hydrogen peroxide production and units for water production preferably are alternately arranged in the same electrolytic cell so that the oxygen gas and hydrogen gas generated in the electrolytic cell are used for hydrogen peroxide production in the same electrolytic cell. This structure eliminates the necessity of piping, etc., and can attain an apparatus size reduction.

From the standpoint of economic efficiency, the units for hydrogen peroxide production and the units for water production are desirably arranged so that the anode side of the former faces the cathode side of the latter and the cathode side of the former faces the anode side of the latter. In this manner, almost all the hydrogen gas and oxygen gas generated in the latter units can be used for the production of hydrogen peroxide in the former units.

A brine such as, e.g., seawater or an aqueous sodium chloride solution is passed through the space between the two electrodes of each unit for hydrogen peroxide production to thereby produce hydrogen peroxide. As described above, the anode of each unit for hydrogen peroxide production comprises a gas diffusion anode. This gas diffusion anode may be an ordinary electrode, and any hydrogen gas diffusion anode can be used. However, from the standpoint of minimizing the influence of impurities contained in seawater, which is frequently used, a preferred structure comprises a liquid- and gas-permeable anode having an ion-exchange membrane disposed in intimate contact with the seawater-side surface thereof. By using this structure, the influence of the impurity ions and sodium chloride contained in seawater on the gas diffusion electrode are minimized and the apparatus can be stably operated over a long period of time.

The gas diffusion cathode disposed apart from the gas diffusion anode described above is desirably a semihydrophobic type cathode so as to effectively use an oxygen-containing gas supplied from the back side thereof. This cathode not only eliminates the necessity of excess oxygen feeding but can have a flat surface. As a result, even when calcium and magnesium contained in the seawater precipitate as hydroxides due to a pH change attributable to the generation of hydroxyl groups by the cathodic reaction, the precipitate can be easily removed from the electrode surface. Even when a semihydrophobic gas diffusion electrode is used, the precipitate deposited thereon can be blown off as long as the hydrophobic part thereof has sufficient porosity so that, when a nitrogen-containing feed gas is used, the nitrogen can be discharged into the side facing the unit for hydrogen peroxide production.

The catalyst material of this gas diffusion cathode is not particularly limited as long as the two-electron reaction selectively occurs thereon. However, use is generally made, for example, of carbon (graphite or carbon black) having gold particles deposited thereon, a gold alloy, or a gold catalyst prepared by applying a solution of a gold salt on a base and burning the coated base in air or a reducing atmosphere.

The units for water electrolysis disposed together with the units for hydrogen peroxide production in the same electrolytic cell are not particularly limited as long as oxygen gas and hydrogen gas are produced in each of the units on the anode and the cathode, respectively, by ordinary water electrolysis. However, the units for water electrolysis desirably have a structure adapted for feeding the two gases generated therein to the adjacent units for hydrogen peroxide production. In order to evenly feed these gases, sufficient space is desirably provided between the two kinds of units. To prevent liquid mixing, a buffer which is permeable only to gases, e.g., a sheet, is preferably interposed between the two kinds of units. An even simpler structure is obtained, for example, by using a thick ion-exchange membrane in each unit for water electrolysis in such manner that the two electrodes are disposed in close contact with the ion-exchange membrane and that water is fed to an edge of the ion-exchange membrane by dropping, etc., to diffuse the water throughout the whole ion-exchange membrane. This structure eliminates the necessity of providing a water feeder as a separate means. In this case, hydrophobizing the other side of each electrode is more effective because water retention within the electrode is enhanced. Another technique is to use a porous film impregnated with an alkali. In this case, water is fed to the alkali-impregnated porous film and the excess water is recovered from a lower part thereof.

The anode and the cathode used in each unit for water electrolysis are not particularly limited. For example, an insoluble metal electrode which comprises a titanium mesh or perforated plate as a base and a coating of an electrode material formed on the surface of the base called a DSE can be used as the anode, while a nickel material likewise in the form of a mesh, perforated plate, or the like can be used as the cathode. In the case of using an alkaline electrolytic solution, rather than a DSE the same nickel electrode as the cathode can be used as the anode. It is also possible to use a gas diffusion anode and a gas diffusion cathode as in the units for hydrogen peroxide production.

Each of these electrodes may be subjected, on the side opposite the electrolysis side, to treatment with fluororesin or the like to impart water repellency thereto. The technique for imparting water repellency is not particularly limited. For example, in the case of a nickel electrode, the surface may be made water-repellent by plating the surface with nickel containing a PTFE resin dispersed therein. In the case of a titanium electrode, water repellency can be imparted by preparing a mixture of graphite fluoride with a chemical solution for use in depositing an electrode material by baking or with a solution of tantalum chloride or titanium chloride, applying the mixture to the electrode, and then baking the resultant coating at 350 to 500° C.

An embodiment of the electrolytic cell for hydrogen peroxide production according to the present invention will be described below by reference to the accompanying drawing. However, the invention should not be construed as being limited thereto.

FIG. 1 is a vertical sectional view illustrating one embodiment of the electrolytic cell for hydrogen peroxide production according to the present invention.

The electrolytic cell main body 1 includes three units for pure-water electrolysis 2 and, alternately disposed therewith, two units for hydrogen peroxide production 3. Each pure-water electrolysis unit 2 comprises: a cation-exchange membrane 4; a gas diffusion anode for pure-water electrolysis 6 which is in intimate contact with the left side of the membrane 4 and connected to an anode collector 5; and a gas diffusion cathode for pure-water electrolysis 8 which is in intimate contact with the right side of the membrane 4 and connected to a cathode collector 7.

On the other hand, each hydrogen peroxide production unit 3 comprises: a cation-exchange membrane 9; a gas diffusion anode for hydrogen ion production 11 which is in intimate contact with the left side of the membrane 9 and connected to an anode collector 10 and which has, deposited thereon, an electrode material capable of selectively producing hydrogen ion by electrolysis; and a gas diffusion cathode for hydrogen peroxide production 13 which is disposed on the right side of and apart from the membrane 9 and connected to a cathode collector 12. A seawater inlet 14 and a seawater outlet 15 are provided in the bottom plate and the top plate of that part, respectively, of the electrolytic cell main body 1 which corresponds to each hydrogen peroxide production unit 3.

In the pure-water electrolysis units 2, the collectors 5 and 7 facing a hydrogen peroxide production unit 3 each has a gas-permeable sheet 16 in intimate contact therewith to prevent the electrolytic solution within the hydrogen peroxide production unit 3 from entering the pure-water electrolysis unit 2.

When current is passed through the two electrodes of each of the units 2 and 3 in the electrolytic cell main body 1, which has the structure described above, while feeding seawater through the seawater inlets 14 and further dropping water onto the upper edge of the cation-exchange membrane 4 of each pure-water electrolysis unit 2 to thereby supply water to the pure-water electrolysis units 2, then oxygen is generated on the anode of each pure-water electrolysis unit 2. The oxygen thus generated in each unit 2 passes through the liquid-permeable sheet 16 and is fed to the cathode of the adjacent hydrogen peroxide production unit 3. Hydrogen is generated on the cathode of each pure-water electrolysis unit 2. The hydrogen passes through the liquid-permeable sheet 16 and is fed to the anode of the adjacent hydrogen peroxide production unit 3. Thus, the required gases can be adequately supplied to each hydrogen peroxide production unit 3. As a result, hydrogen peroxide is produced on the cathode surface in each unit 3 and dissolves in the seawater, which is recurred as a high-concentration aqueous hydrogen peroxide solution through the seawater outlet 15.

The present invention will be explained below in more detail by reference to Examples thereof in which a brine is electrolyzed to produce a brine containing hydrogen peroxide. However, these Examples should not be construed as limiting the scope of the invention.

EXAMPLE 1

A gas- and liquid-permeable, porous carbon anode having a platinum catalyst deposited thereon and a carbon cathode having a gold catalyst deposited thereon were prepared each having an electrode area of 0.2 dm$^2$. An electrolytic cell for hydrogen peroxide production was fabricated by bringing the anode into intimate contact with a cation-exchange membrane Nafion 117, manufactured by E. I. du Pont de Nemours & Co., and disposing the cathode on the opposite side of the cation-exchange membrane in such manner that the distance between the cathode and the anode was 5 mm and such that the periphery of the cathode was brought into intimate contact with the circumferential wall to form an intermediate chamber between the cation-exchange membrane and the cathode.

A gas diffusion anode obtained by depositing iridium particles on a titanium fiber sinter (collector) with a fluororesin and a gas diffusion cathode obtained by depositing platinum particles on a stainless-steel fiber sinter (collector) with a fluororesin were brought into intimate contact with a cation-exchange membrane Nafion 117, manufactured by E. I. du Pont de Nemours & Co., to fabricate an electrolytic cell for pure-water electrolysis. Two such cells for pure-water electrolysis were thus fabricated.

The anode chamber of each cell for pure-water electrolysis was connected to the cathode chamber of the electrolytic cell for hydrogen peroxide production, while the cathode chamber of each cell for pure-water electrolysis was connected to the anode chamber of the electrolytic cell for hydrogen peroxide production.

An aqueous sodium chloride solution kept neutral was passed through the intermediate chamber of the electrolytic cell for hydrogen peroxide production at a rate of 15 ml/min. The hydrogen generated in the cathode chambers of the cells for pure-water electrolysis was introduced into the anode chamber of the electrolytic cell for hydrogen peroxide production at a rate of 15 ml/min, while a mixture of the oxygen generated in the anode chambers of the cells for pure-water electrolysis together with oxygen supplied from an oxygen gas cylinder was introduced into the cathode chamber of the electrolytic cell for hydrogen peroxide production at a rate of 10 ml/min. Under these conditions, a current of 1 A was passed through the electrolytic cell to electrolyze the aqueous sodium chloride solution at an inlet temperature of 20° C. As a result, the electrolytic cell for hydrogen peroxide production had a cell voltage of 2.0 V, and a 0.6 g/l hydrogen peroxide solution was obtained from the outlet of the intermediate chamber at a current efficiency of 80%. The total cell voltage of the electrolytic cell for hydrogen peroxide production and the cells for pure-water electrolysis was 6 V.

EXAMPLE 2

Electrolysis was conducted under the same conditions as in Example 1, except that (i) an electrolytic cell for alkali electrolysis was used in place of each of the cells for pure-water electrolysis, employing a nickel mesh as each of the anode and cathode and a hydrophilic polyfluorocarbon paper as a diaphragm in place of the cation-exchange membrane and in which the distance between the diaphragm and each electrode was 2 mm, and (ii) a 1M sodium hydroxide solution was used as an electrolyte. As a result, the electrolytic cell for hydrogen peroxide production had a cell voltage of 2.0 V, and a 0.6 g/l hydrogen peroxide solution was obtained from the outlet of the intermediate chamber at a current efficiency of 80%. The total cell voltage was 6.6 V.

A comparison between Examples 1 and 2 shows that hydrogen peroxide can be produced at the same efficiency even without using an alkali, and that a lower cell voltage is obtained by not using an alkali.

In a first embodiment, the present invention provides an electrolytic cell for hydrogen peroxide production which has a hydrogen gas diffusion anode and an oxygen gas diffusion cathode disposed apart from the anode, and which is used for conducting electrolysis while passing a brine between the electrodes to thereby produce a brine containing hydrogen peroxide.

A characteristic feature of the present invention resides in the use of a hydrogen gas diffusion anode as the anode for the production of hydrogen peroxide by brine electrolysis. A gas diffusion anode has a reduced oxidizing ability as compared with conventional anodes, e.g., DSEs. Hence, the use of a gas diffusion anode is effective in inhibiting the generation of carcinogenic substances such as trihalomethanes and promotes environmental conservation. Furthermore, even without using an alkali, hydrogen peroxide can be produced at almost the same efficiency.

In a second embodiment, the present invention provides an electrolytic cell for hydrogen peroxide production which has a hydrogen gas diffusion anode and an oxygen gas diffusion cathode disposed apart from the anode, and which is used for conducting electrolysis while supplying hydrogen gas and an oxygen-containing gas to the hydrogen gas diffusion anode and the oxygen gas diffusion cathode, respectively, and passing a brine between the electrodes to thereby produce a brine containing hydrogen peroxide.

Thus, a second characteristic feature of the present invention resides in that hydrogen gas and an oxygen-containing gas are positively supplied to the two gas diffusion electrodes to accelerate the electrolytic reactions. The gases may be supplied from external bombs, etc. Because adequate gas feeding is enabled, hydrogen peroxide is generated efficiently. Hence, a high-concentration hydrogen peroxide solution can be produced.

In a third embodiment, the present invention provides an electrolytic cell for hydrogen peroxide production which comprises (i) an electrolytic cell for hydrogen peroxide production having a hydrogen gas diffusion anode and an oxygen gas diffusion cathode disposed apart from the anode, and (ii) a water-electrolyzing cell. The apparatus is used for conducting electrolysis while feeding the oxygen and the hydrogen generating on the anode side and the cathode side of the water-electrolyzing cell to the oxygen gas diffusion cathode and the hydrogen gas diffusion anode, respectively, and passing a brine between the gas diffusion electrodes to thereby produce a brine containing hydrogen peroxide.

Thus, a third characteristic feature of the present invention resides in that the gases supplied to the two gas diffusion electrodes of the electrolytic cell for hydrogen peroxide production are produced mainly by water electrolysis. For this electrolysis, a unit (electrolytic cell) for water electrolysis is disposed in proximity to a unit (electrolytic cell) for hydrogen peroxide production. The gases thus generated can be completely utilized for the production of hydrogen peroxide.

In a fourth embodiment, the present invention provides an electrolytic cell for hydrogen peroxide production which comprises two or more units (electrolytic cells) for hydrogen peroxide production each having a hydrogen gas diffusion anode and an oxygen gas diffusion cathode disposed apart from the anode and two or more units (electrolytic cells) for water electrolysis. The two kinds of units are arranged alternately so that the oxygen and the hydrogen generating on the anode side and the cathode side of each unit for water electrolysis are fed to the oxygen gas diffusion cathode and the hydrogen gas diffusion anode of an electrolytic cell for hydrogen peroxide production, respectively. The electrolytic cell is used for conducting electrolysis while passing a brine between the gas diffusion electrodes of the electrolytic cells for hydrogen peroxide production to thereby produce a brine containing hydrogen peroxide.

Thus, a fourth characteristic feature of the present invention resides in that an apparatus size reduction can be easily attained because the electrolytic cells (units) for hydrogen peroxide production and the electrolytic cells (units) for water production are disposed within the same electrolytic apparatus.

While the invention has been described in detail and with reference to specific embodiments thereof, it will be apparent to one skilled in the art that various changes and modifications can be made therein without departing from the spirit and scope thereof.

What is claimed is:

1. An electrolytic cell for producing by electrolysis a brine containing hydrogen peroxide, which comprises a hydrogen gas diffusion anode an oxygen gas diffusion cathode disposed apart from the anode, a water-electrolyzing cell for supplying hydrogen gas and an oxygen-containing gas to the hydrogen gas diffusion anode and the oxygen gas diffusion cathode, respectively, and an inlet and an outlet for passing a brine between the anode and the cathode.

2. The electrolytic cell as claimed in claim 1 comprising a cation-exchange membrane, said hydrogen gas diffusion anode being disposed in intimate contact with one surface of said cation-exchange membrane and said oxygen gas diffusion cathode being disposed apart from an opposing surface of said cation-exchange membrane.

3. An electrolytic cell for producing by electrolysis a brine containing hydrogen peroxide, which comprises a first electrolytic cell comprising a hydrogen gas diffusion anode and an oxygen gas diffusion cathode disposed apart from the hydrogen gas diffusion anode, a water-electrolyzing cell for supplying oxygen and hydrogen to the oxygen gas diffusion cathode and the hydrogen gas diffusion anode, respectively, and an inlet and an outlet for passing a brine between the hydrogen gas diffusion anode and the oxygen diffusion cathode.

4. The electrolytic cell as claimed in claim 3, wherein said first electrolytic cell comprises a cation-exchange membrane, said hydrogen gas diffusion anode being disposed in intimate contact with one surface of said cation-exchange membrane and said oxygen gas diffusion cathode being disposed apart from an opposing surface of said cation-exchange membrane.

5. The electrolytic cell as claimed in claim 3, further comprising a buffer permeable to gases but not to liquids interposed between said first electrolytic cell and said water-electrolyzing cell.

6. The electrolytic cell as claimed in claim 3 comprising at least first and second water-electrolyzing cells including an anode side generating oxygen and a cathode side generating hydrogen, said cells being arranged such that the hydrogen gas diffusion anode faces a cathode side of one of said water-electrolyzing cells and the oxygen gas diffusion cathode faces an anode side of one of said water-electrolyzing cells.

7. The electrolytic cell as claimed in claim 3, comprising means for supplying water to said water-electrolyzing cell.

8. An electrolytic cell for producing by electrolysis a brine containing hydrogen peroxide, which comprises one or more first electrolytic cell unit each comprising a hydrogen gas diffusion anode and an oxygen gas diffusion cathode disposed apart from the hydrogen gas diffusion anode, two or more second electrolytic cell units for water electrolysis each having an anode side for generating oxygen and a cathode side for generating hydrogen, said first and second units being arranged alternately such that oxygen and hydrogen generating from an anode side and a cathode side, respectively, of said second units is supplied to an oxygen gas diffusion cathode and a hydrogen gas diffusion anode of said one or more first units, respectively, and an inlet and an outlet for passing a brine between the gas diffusion electrodes of said one or more first electrolytic cell units.

9. The electrolytic cell as claimed in claim 8, comprising two or more first electrolytic cell units.

10. The electrolytic cell as claimed in claim 8, wherein a hydrogen gas diffusion anode of said one or more first units faces a cathode side of said second units, and an oxygen gas diffusion cathode of said one or more first units faces an anode side of said second units.

11. The electrolytic cell as claimed in claim 8, further comprising a buffer permeable to gases but not to liquids interposed between said first and second units.

12. The electrolytic cell as claimed in claim 8, comprising means for supplying water for electrolysis to said second units.

13. The electrolytic cell as claimed in claim 8, wherein said one or more first electrolytic cell units each comprises a cation-exchange membrane, said hydrogen gas diffusion anode being disposed in intimate contact with one surface of said cation-exchange membrane and said oxygen gas diffusion cathode being disposed apart from an opposing surface of said cation-exchange membrane, said two or more electrolytic cell units for water electrolysis each comprising a cation-exchange membrane, a gas diffusion anode disposed in intimate contact with one surface of said cation-exchange membrane, and a gas diffusion cathode disposed in intimate contact with an opposing surface of said cation-exchange membrane.

14. The electrolytic cell as claimed in claim 13, further comprising a buffer permeable to gases but not to liquids interposed between said first and second units.

15. An electrolytic cell for producing by electrolysis a brine containing hydrogen peroxide, which comprises a hydrogen gas diffusion anode and an oxygen gas diffusion cathode disposed apart from the anode, a gas cylinder for supplying hydrogen gas and an oxygen-containing gas to the hydrogen gas diffusion anode and the oxygen gas diffusion cathode, respectively, and an inlet and an outlet for passing a brine between the anode and the cathode.

* * * * *